United States Patent
Iwakiri

(10) Patent No.: US 10,757,397 B2
(45) Date of Patent: Aug. 25, 2020

(54) INFORMATION PROCESSING APPARATUS, INFORMATION PROCESSING SYSTEM, INFORMATION PROCESSING METHOD, AND STORAGE MEDIUM

(71) Applicant: CANON KABUSHIKI KAISHA, Tokyo (JP)

(72) Inventor: Yoshiki Iwakiri, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 71 days.

(21) Appl. No.: 15/994,282

(22) Filed: May 31, 2018

(65) Prior Publication Data
US 2018/0352215 A1   Dec. 6, 2018

(30) Foreign Application Priority Data
Jun. 6, 2017   (JP) ................. 2017-111603

(51) Int. Cl.
| | | |
|---|---|---|
| H04N 13/282 | (2018.01) | |
| H04N 13/117 | (2018.01) | |
| H04N 13/296 | (2018.01) | |
| H04N 13/398 | (2018.01) | |
| H04N 17/00 | (2006.01) | |
| H04N 5/262 | (2006.01) | |
| H04N 5/232 | (2006.01) | |

(Continued)

(52) U.S. Cl.
CPC ....... *H04N 13/282* (2018.05); *H04N 5/23206* (2013.01); *H04N 5/262* (2013.01); *H04N 5/2628* (2013.01); *H04N 13/117* (2018.05); *H04N 13/243* (2018.05); *H04N 13/296* (2018.05); *H04N 13/398* (2018.05); *H04N 17/002* (2013.01); *H04N 5/247* (2013.01)

(58) Field of Classification Search
CPC .. H04N 13/117; H04N 13/243; H04N 13/282; H04N 13/296; H04N 13/398; H04N 17/002; H04N 5/23206; H04N 5/247; H04N 5/2628; H04N 7/181; H04N 5/23238; H04N 5/23296; H04N 13/194; H04N 13/279; H04N 13/366; H04N 13/239; H04N 13/25; H04N 13/111; H04N 13/106; G06T 15/20; G06T 15/205; G06T 2207/30241; G06T 7/70
See application file for complete search history.

(56) References Cited

U.S. PATENT DOCUMENTS

| | | | | |
|---|---|---|---|---|
| 8,953,046 B2 * | 2/2015 | Kotani | ................... | H04N 7/181 348/159 |
| 2011/0244956 A1 * | 10/2011 | Sakakibara | ........... | A63F 13/213 463/31 |

(Continued)

FOREIGN PATENT DOCUMENTS

JP   200469311 A   3/2004

*Primary Examiner* — Nathnael Aynalem
(74) *Attorney, Agent, or Firm* — Canon U.S.A., Inc. IP Division

(57) ABSTRACT

An information processing apparatus for setting a virtual viewpoint relating to a virtual viewpoint image to be generated based on a plurality of images to be captured by a plurality of cameras includes an accepting unit configured to accept a setting about a position and direction of the virtual viewpoint, and a changing unit configured to change the setting based on a feature amount of the setting about the virtual viewpoint accepted by the accepting unit.

18 Claims, 12 Drawing Sheets

(51) Int. Cl.
*H04N 13/243* (2018.01)
*H04N 5/247* (2006.01)

(56) References Cited

U.S. PATENT DOCUMENTS

| | | | | |
|---|---|---|---|---|
| 2012/0188452 A1* | 7/2012 | Keiser | ................... | G06T 13/00 |
| | | | | 348/559 |
| 2016/0092056 A1* | 3/2016 | Yang | ..................... | H04N 7/181 |
| | | | | 348/143 |
| 2017/0318283 A1* | 11/2017 | Watson | ............... | H04N 13/366 |

* cited by examiner

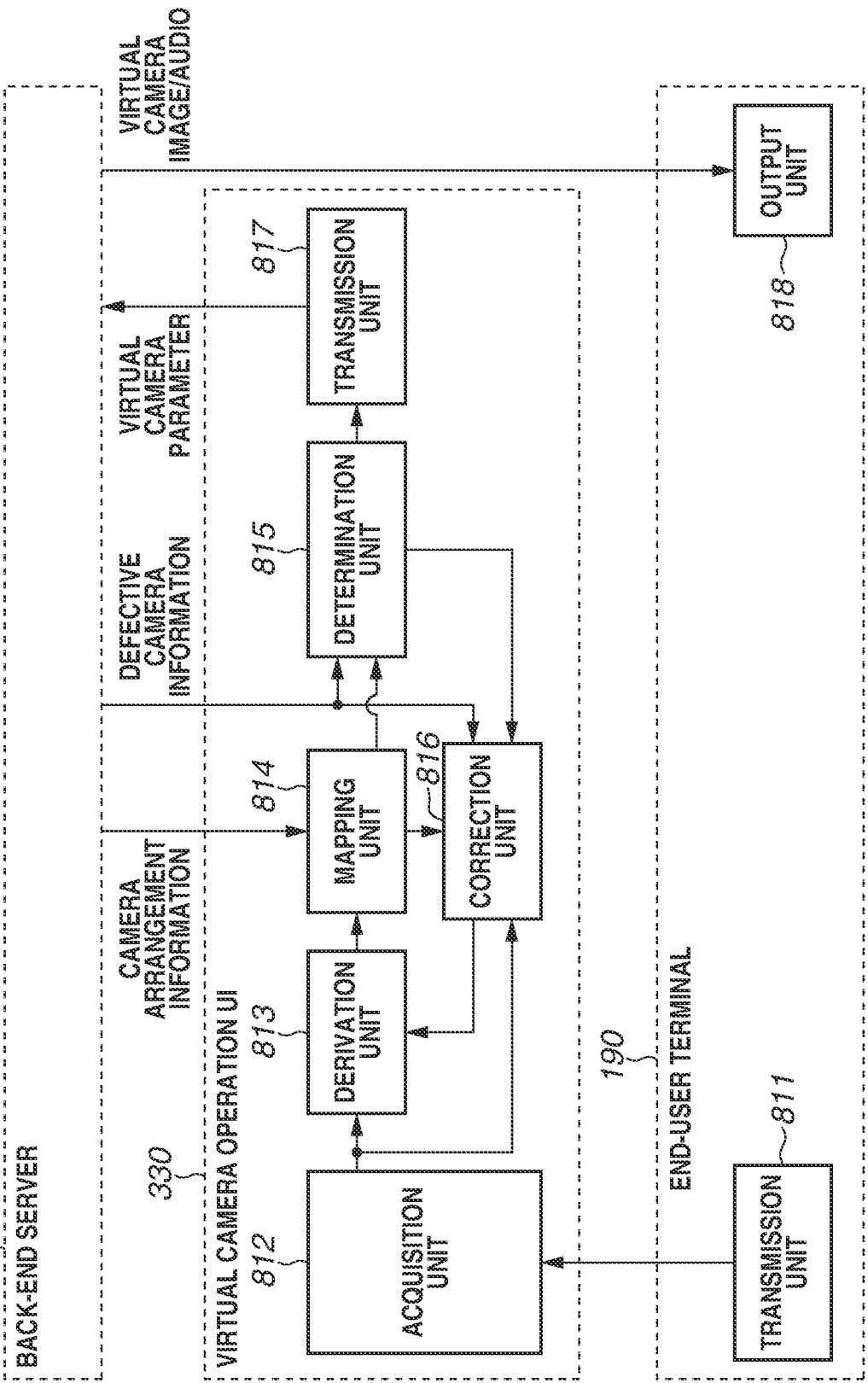

| | FEATURE DATA | | | |
|---|---|---|---|---|
| | START POSITION | END POSITION | HEIGHT CHANGE POSITION | ENLARGEMENT CHANGE POSITION |
| COORDINATE X | 0 | 30000 | 15000 | 15000 |
| COORDINATE Y | 0 | 0 | 5000 | 5000 |
| COORDINATE Z | 3000 | 3000 | 6000 | 6000 |
| ENLARGEMENT RATIO (TIMES) | 1.0 | 1.0 | 2.0 | 2.0 |
| TIME (SECONDS) | 0 | 10.0 | 5.0 | 5.0 |

| | FEATURE DATA | |
|---|---|---|
| | START POSITION | END POSITION |
| COORDINATE X | 0 | 30000 |
| COORDINATE Y | 5000 | 5000 |
| COORDINATE Z | 3000 | 3000 |
| ENLARGEMENT RATIO (TIMES) | 1.0 | 1.0 |
| TIME (SECONDS) | 0 | 10.0 |

INFORMATION PROCESSING APPARATUS, INFORMATION PROCESSING SYSTEM, INFORMATION PROCESSING METHOD, AND STORAGE MEDIUM

BACKGROUND

Field of the Disclosure

The present disclosure relates to an information processing apparatus, an information processing system, an information processing method, and a storage medium.

Description of the Related Art

In recent years, a technique of generating a virtual viewpoint image using multiple viewpoint images obtained by performing synchronous imaging from multiple viewpoints by a plurality of cameras installed at different positions has attracted attention. According to the technique of generating a virtual viewpoint image using multiple viewpoint images, users may view, for example, a highlight scene of soccer or basketball at various angles, which provides the users with higher realistic sensation as compared with normal images.

The generation and browsing of the virtual viewpoint image based on the multiple viewpoint images can be achieved by collecting images captured by a plurality of cameras into an image processing unit, such as a server, performing processing such as three-dimensional model generation and rendering on the images by the image processing unit, and transmitting the processed images to a user terminal.

In the case of generating a virtual viewpoint image, the user can freely operate the user terminal to move the viewpoint. In this case, the viewpoint movement of the same pattern is constantly carried out in some specific scenes. For example, in the case of a soccer game, the viewpoint is moved around a kicker in an arc in a penalty or corner kick, or the viewpoint is moved along a dribbler in a dribbling scene in which the dribbler is running toward the goal along a side of a soccer pitch. Accordingly, it is useful to generate a virtual viewpoint image only by determining a viewpoint movement pattern (hereinafter referred to as a camera path) in advance and selecting the predetermined camera path upon detection of a specific scene. However, in the case of generating a virtual viewpoint image based on the selected camera path, if a real camera video image is broken due to, for example, a failure of a camera, the virtual viewpoint image cannot be generated and a video image with low quality is displayed.

Japanese Patent Application Laid-Open No. 2004-69311 discusses a technique in which when an abnormality is detected on a preliminarily designated path, a path search is performed to determine a path that does not pass an abnormal section and a user is informed of the determined path.

However, in the technique discussed in Japanese Patent Application Laid-Open No. 2004-69311, if the path of the virtual viewpoint is corrected, a video image which is unintended by the user may be generated. For example, in soccer scenes as described above, the path is designated so that the user can view a video image with a viewpoint having such a feature that the viewpoint is moved around a kicker in an arc. If a new path is set without consideration of the feature, a video image that does not include the kicker may be generated, so that the content of the video image may be different from the content desired by the user.

SUMMARY

According to an aspect of the present disclosure, an information processing apparatus for setting a virtual viewpoint relating to a virtual viewpoint image to be generated based on a plurality of images to be captured by a plurality of cameras includes an accepting unit configured to accept a setting about a position and direction of the virtual viewpoint, and a changing unit configured to change the setting based on a feature amount of the setting about the virtual viewpoint accepted by the accepting unit.

Further features of the present disclosure will become apparent from the following description of exemplary embodiments with reference to the attached drawings.

BRIEF DESCRIPTION OF THE DRAWINGS

FIG. 3 is a block diagram illustrating an example of a functional configuration of a virtual camera operation user interface (UI) and the like according to one or more aspects of the present disclosure.

FIGS. 4A and 4B are diagrams each illustrating virtual cameras and the like.

FIGS. 7A to 7C are diagrams each illustrating an example of feature data and the like.

DESCRIPTION OF THE EMBODIMENTS

A first exemplary embodiment of the present disclosure will be described with reference to the drawings.

Figure 1:
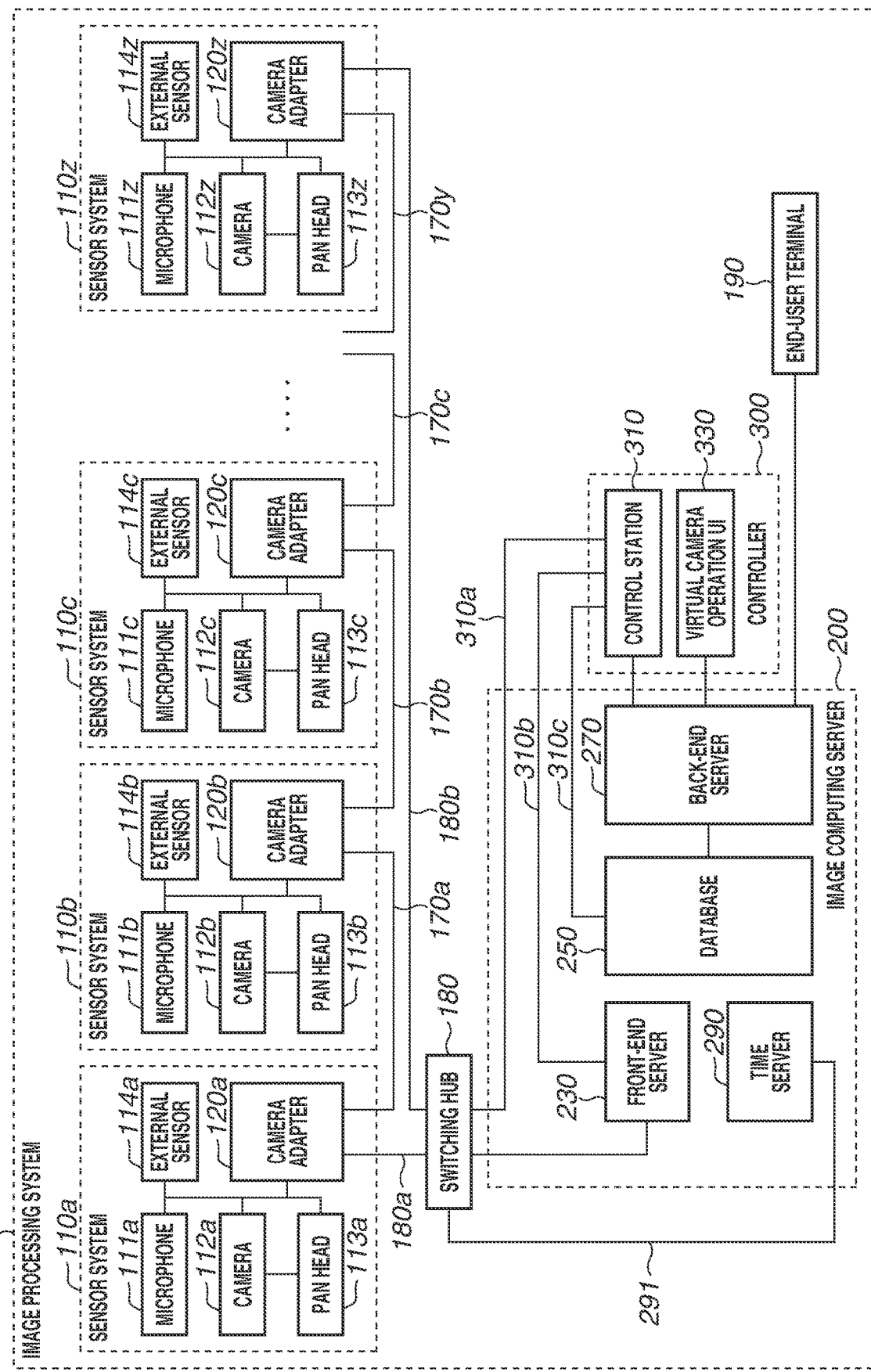
FIG. 1 is a block diagram illustrating an example of a system configuration and the like of an image processing system.

An image processing system, in which a plurality of cameras and microphones installed in facilities, such as a stadium or a concert hall, are used for capturing images and collecting sounds, will be described with reference to FIG. 1. An image processing system 100 includes sensor systems 110a to 110z, an image computing server 200, a controller 300, a switching hub 180, and an end-user terminal 190. The image processing system 100 illustrated in FIG. 1 is an example of an information processing system. The controller 300 includes a control station 310 and a virtual camera operation user interface (UI) 330. The control station 310 performs management of an operation state, parameter setting control, and the like on each of blocks constituting the image processing system 100 through networks 310a to 310c, 180a, 180b, and 170a to 170y. The control station 310 generates defective camera information when a failure is detected in a device of the sensor system 110. The defective camera information includes information for identifying a defective camera and information about an abnormal period. The defective camera information is used during generation of a virtual viewpoint image so that a video image output from a defective camera will not be used for generating a virtual viewpoint image. The networks used herein may be configured using Ethernet®, such as Gigabit Ethernet® (GbE) or 10 GbE, which are based on IEEE standards, or may be configured by combining Interconnect Infiniband, Industrial Ethernet, and the like. The networks are not limited to these types, but instead other types of networks may be used. The controller 300 is an example of an information processing apparatus.

An operation for transmitting twenty-six sets of images and audio of the sensor systems 110a to 110z from the sensor system 110z to the image computing server 200 will be described. In the image processing system 100 according to the present exemplary embodiment, the sensor systems 110a to 110z are connected to each other by a daisy chain.

In the present exemplary embodiment, the twenty-six sets of systems of the sensor systems 110a to 110z are not distinguished from each other and are collectively referred to as a sensor system 110 unless otherwise described. Similarly, devices included in each of the sensor systems 110 are not distinguished from each other and are collectively referred to as a microphone 111, a camera 112, a pan head 113, an external sensor 114, and a camera adapter 120, unless otherwise described. Although the twenty-six sets of sensor systems are illustrated as the number of sensor systems, the number is merely an example. The number of sensor systems is not limited to twenty-six sets. In the present exemplary embodiment, the term "image" includes a concept of a moving image and a still image, unless otherwise noted. Specifically, the image processing system 100 according to the present exemplary embodiment is capable of processing both of still images and moving images. In the present exemplary embodiment, a case where a virtual viewpoint image provided by the image processing system 100 includes a virtual viewpoint image and virtual viewpoint audio is mainly described by way of example, but the present disclosure is not limited to this case. For example, the virtual viewpoint image may not include audio. For example, audio included in the virtual viewpoint image may be collected by a microphone positioned closest to a virtual viewpoint. Although the description of audio is partially omitted for simplicity of explanation in the present exemplary embodiment, an image and audio are basically processed at the same time.

The sensor systems 110a to 110z include cameras 112a to 112z, respectively. Specifically, the image processing system 100 includes a plurality of cameras 112 for capturing images of a subject from a plurality of directions. The plurality of sensor systems 110 is connected to each other by the daisy chain. With this connection form, effects of reducing the number of connection cables and reducing wiring works can be attained when the amount of image data is increased due to a higher resolution and a higher frame rate required for 4K, 8K, or the like of captured images.

The connection form is not limited to the daisy chain, and a star type network configuration in which the sensor systems 110a to 110z are each connected to the switching hub 180 and perform data transmission and reception through the switching hub 180 may be employed.

Although FIG. 1 illustrates a configuration in which all the sensor systems 110a to 110z are connected by cascade connection so that the daisy chain is configured, the connection form is not limited to this form. For example, the plurality of sensor systems 110 may be divided into some groups and the sensor systems 110 may be connected by the daisy chain in each group obtained by the division. Then, the camera adapters 120 serving as terminals of the division units may be connected to the switching hub 180 so that images are input to the image computing server 200. Such a configuration is particularly effective in stadiums. For example, it is assumed that a stadium has a plurality of floors and the sensor systems 110 are installed on the respective floors. In this case, input to the image computing server 200 can be performed on each floor or on each half circumference of the stadium. Accordingly, installation of the sensor systems 110 may be simplified and the image processing system 100 can be made flexible even in a location where it is difficult to wire all the sensor systems 110 by one daisy chain.

The image computing server 200 can change control of image processing depending on a result of a determination as to whether the number of camera adapters 120 which are connected by the daisy chain and which inputs images to the image computing server 200 is one or more. Specifically, the image computing server 200 can change the control depending on a result of a determination as to whether the sensor systems 110 are divided into a plurality of groups. In a case where only one camera adapter 120 performs image input, an image of the entire circumference of the stadium is generated while image transmission is performed by the daisy chain connection, and thus timings when the image computing server 200 obtains image data on the entire circumference of the stadium are synchronized. In other words, if the sensor systems 110 are not divided into groups, the image computing server 200 can synchronize the timings for obtaining image data on the entire circumference of the stadium without performing a special synchronization control.

However, in a case where a plurality of camera adapters 120 is used for image input (sensor systems 110 are divided into groups), different delays may occur in different lanes (paths) of the daisy chain. Therefore, in the image computing server 200, image processing needs to be performed at a subsequent stage while a mass of image data is checked by synchronization control in which synchronization is performed by waiting until image data on the entire circumference of the stadium is obtained.

In the present exemplary embodiment, the sensor system 110a includes a microphone 111a, a camera 112a, a pan head 113a, an external sensor 114a, and a camera adapter 120a. The configuration of the sensor system 110a is not limited to this configuration as long as the sensor system 110a includes at least one camera adapter 120a and one camera 112a or one microphone 111a. For example, the sensor system 110a may include one camera adapter 120a and a plurality of cameras 112a or include one camera 112a and a plurality of camera adapters 120a. Specifically, the plurality of cameras 112 and the plurality of camera adapters 120 included in the image processing system 100 have the relationship of a ratio of N:M (N and M are integers not less than 1). The sensor system 110 may include devices other than the microphone 111a, the camera 112a, the pan head 113a, and the camera adapter 120a. The camera 112 and the camera adapter 120 may be integrated with each other. Further, a front-end server 230 may have at least some of the functions of the camera adapter 120. Since the sensor systems 110b to 110z each have a configuration similar to that of the sensor system 110a in the present exemplary embodiment, the description of the configuration of each of the sensor systems 110b to 110z is omitted. The configuration of each of the sensor systems 110b to 110z is not limited to the configuration of the sensor system 110a and the sensor systems 110b to 110z may have different configurations.

Audio collected by the microphone 111a and an image captured by the camera 112a are subjected to image processing as described below by the camera adapter 120a before being transmitted to the camera adapter 120b included in the sensor system 110b through the daisy chain 170a. Similarly, the sensor system 110b transmits collected audio and a captured image, in addition to the image and audio obtained from the sensor system 110a, to the sensor system 110c.

By continuously performing the operation described above, images and audio obtained by the sensor systems 110a to 110z are transmitted to the switching hub 180 from the sensor system 110z through the network 180b. After that, the image and audio are transmitted to the image computing server 200.

Although the cameras 112a to 112z are separated from the camera adapters 120a to 120z in the present exemplary embodiment, the cameras 112a to 112z and the camera adapters 120a to 120z may be integrated in the same housings. In this case, the microphones 111a to 111z may be incorporated in the integrated camera 112 or externally connected to the camera 112.

The configuration and operation of the image computing server 200 will be described. The image computing server 200 according to the present exemplary embodiment performs processing on data acquired from the sensor system 110z. The image computing server 200 includes the front-end server 230, a database 250 (hereinafter referred to also as a DB), a back-end server 270, and a time server 290.

The time server 290 has a function of delivering a time and a synchronization signal and delivers a time and a synchronization signal to the sensor systems 110a to 110z through the switching hub 180. The camera adapters 120a to 120z which have received the time and the synchronization signal perform generator locking (Genlock) on the cameras 112a to 112z based on the time and the synchronization signal so as to perform image frame synchronization. Specifically, the time server 290 synchronizes imaging timings of the plurality of cameras 112. With this configuration, the image processing system 100 can generate a virtual viewpoint image based on a plurality of captured images captured at the same timing. Consequently, degradation in the quality of the virtual viewpoint image caused by a difference among the imaging timings can be suppressed. Although the time server 290 manages the time synchronization of the plurality of cameras 112 in the present exemplary embodiment, the present disclosure is not limited to this configuration, and the individual cameras 112 or the individual camera adapters 120 may perform processing for the time synchronization.

The front-end server 230 reconstructs segmented transmission packets using images and audio obtained from the sensor system 110z and converts a data format. After that, the front-end server 230 writes the images and audio into the database 250 in accordance with identifiers of the cameras, data types, and frame numbers.

The back-end server 270 accepts designation of a viewpoint from the virtual camera operation UI 330, reads the corresponding image and audio data from the database 250 based on the accepted viewpoint, and generates a virtual viewpoint image by performing rendering processing. The back-end server 270 acquires defective camera information from the control station 310.

The configuration of the image computing server 200 is not limited to this configuration. For example, at least two of the front-end server 230, the database 250, and the back-end server 270 may be integrated with each other. The image computing server 200 may include at least a plurality of front-end servers 230, a plurality of databases 250, or a plurality of back-end servers 270. A device other than the devices described above may be included at an arbitrary position of the image computing server 200. Moreover, the end-user terminal 190 or the virtual camera operation UI 330 may have at least some of the functions of the image computing server 200.

An image on which rendering processing has been performed is transmitted from the back-end server 270 to the end-user terminal 190 so that the user who operates the end-user terminal 190 can view the image and listen to the audio corresponding to the designated viewpoint. Specifically, the back-end server 270 generates a virtual viewpoint image based on captured images (multiple viewpoint images) captured by the plurality of cameras 112 and viewpoint information. More specifically, the back-end server 270 generates a virtual viewpoint image based on, for example, image data on a predetermined area extracted by the plurality of camera adapters 120 from the images captured by the plurality of cameras 112 and a viewpoint designated by a user operation. The back-end server 270 supplies the generated virtual viewpoint image to the end-user terminal 190. The virtual viewpoint image in the present exemplary embodiment is an image that is obtained when an image of a subject is captured from a virtual viewpoint. In other words, the virtual viewpoint image is an image representing a view from a designated viewpoint. A virtual viewpoint may be designated by the user or may be automatically designated based on a result of an image analysis or the like. Specifically, examples of the virtual viewpoint image include an arbitrary viewpoint image (a free viewpoint image) corresponding to a viewpoint arbitrarily designated by the user. Examples of the virtual viewpoint image also include an image corresponding to a viewpoint designated by the user from among a plurality of candidates and an image corresponding to a viewpoint automatically designated by a device. Although a case where the virtual viewpoint image includes audio data is mainly described as an example in the present exemplary embodiment, the audio data may not be included in the virtual viewpoint image. The back-end server 270 may perform compression encoding on the virtual viewpoint image in accordance with a standard technique as typified by H.264 or High Efficiency Video Coding (HEVC) before transmitting the virtual viewpoint image to the end-user terminal 190 using a Moving Picture Experts Group-Dynamic Adaptive Streaming over HyperText Transfer Protocol (MPEG-DASH). The virtual viewpoint image may be transmitted to the end-user terminal 190 without compression. In particular, the former method of performing compression encoding is employed assuming that a smartphone or a tablet is used as the end-user terminal 190, while the latter method is employed assuming that a display capable of displaying a non-compressed image is used. Specifically, the back-end server 270 can change an image format depending on the type of the end-user terminal 190. The image transmission protocol is not limited to MPEG-DASH, and HyperText Transfer Protocol Live Streaming (HLS) or other transmission methods may also be used.

As described above, the image processing system 100 has three functional domains, i.e., a video image collection domain, a data storage domain, and a video image generation domain. The video image collection domain includes the sensor systems 110a to 110z. The data storage domain includes the database 250, the front-end server 230, and the back-end server 270. The video image generation domain includes the virtual camera operation UI 330 and the end-user terminal 190. The configuration of the image processing system 100 is not limited to this configuration. For example, the virtual camera operation UI 330 may directly obtain images from the sensor systems 110a to 110z. However, in the present exemplary embodiment, a method for arranging the data storage function in an intermediate portion is employed instead of the method for directly obtaining images from the sensor systems 110a to 110z. More specifically, the front-end server 230 converts image data and audio data generated by the sensor systems 110a to 110z and meta-information of the data into a common schema and a common data type of the database 250. With this configuration, even when the type of the cameras 112 of the sensor systems 110a to 110z are changed to another type, a difference in the change can be absorbed by the front-end server 230 and registered in the database 250. Accordingly, the possibility that the virtual camera operation UI 330 may not appropriately operate when the type of the cameras 112 is changed to another type can be reduced.

The virtual camera operation UI 330 does not directly access the database 250 but accesses the database 250 through the back-end server 270. The back-end server 270 performs common processing associated with image generation processing, and the virtual camera operation UI 330 processes a difference portion of an application associated with an operation UI. Accordingly, in the development of the virtual camera operation UI 330, efforts can be focused on development of a UI operation device and development for functional requirements of a UI for operating a virtual viewpoint image to be generated. The back-end server 270 can also add or delete common processing associated with image generation processing in response to a request from the virtual camera operation UI 330. In this way, a request from the virtual camera operation UI 330 can be flexibly dealt with.

As described above, in the image processing system 100, the back-end server 270 generates a virtual viewpoint image based on image data obtained by image capturing performed by the plurality of cameras 112 for capturing images of a subject from a plurality of directions. The configuration of the image processing system 100 according to the present exemplary embodiment is not limited to the physical configuration described above, and the image processing system 100 may be logically configured.

Figure 2:
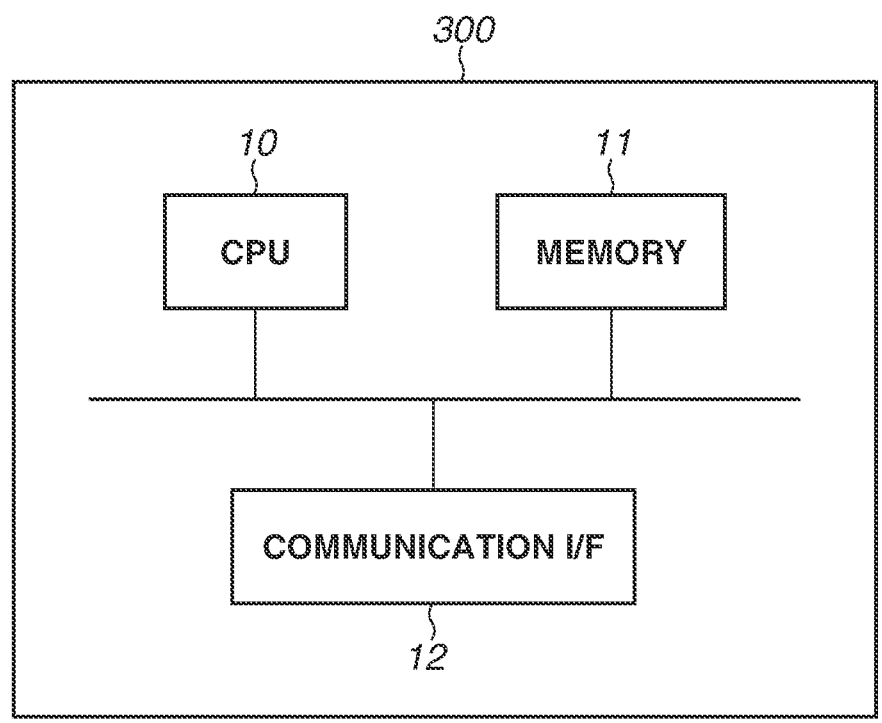
FIG. 2 is a block diagram illustrating an example of a hardware configuration of a controller.

FIG. 2 illustrates an example of the hardware configuration of the controller 300 in the system illustrated in FIG. 1. As illustrated in FIG. 2, in the controller 300, a central processing unit (CPU) 10, a memory 11, and a communication interface (I/F) 12 are communicably connected via a bus as a hardware configuration. The CPU 10 controls the entire controller 300. The CPU 10 executes processing based on programs stored in the memory 11, thereby implementing the functions of the control station 310 and the virtual camera operation UI 330 and processing of flowcharts illustrated in FIGS. 6 and 10 described below. The memory 11 stores programs and data or the like used for the CPU 10 to execute processing based on the programs. The communication I/F 12 controls the communication between the controller 300 and other devices. The above-described hardware configuration of the controller 300 is merely an example. For example, the controller 300 may include a plurality of CPUs, a plurality of memories, and a plurality of communication I/Fs. A plurality of CPUs may execute processing while using a plurality of memories based on programs. Each of the image computing server 200 and the end-user terminal 190 also includes at least, as a hardware configuration, a CPU, a memory, and a communication I/F. Further, the CPU of each device executes processing based on programs stored in the memory of each device, thereby implementing functions and the like of each device. The end-user terminal 190 further includes, as a hardware configuration, a display device, such as a display, and an input device such as a mouse and a keyboard. Screens illustrated in FIGS. 5, 11, 12, and the like described below are displayed on the display device of the end-user terminal 190.

The functional configuration of the virtual camera operation UI 330 in the image processing system illustrated in FIG. 1 will be described with reference to FIG. 3.

Figure 4A:
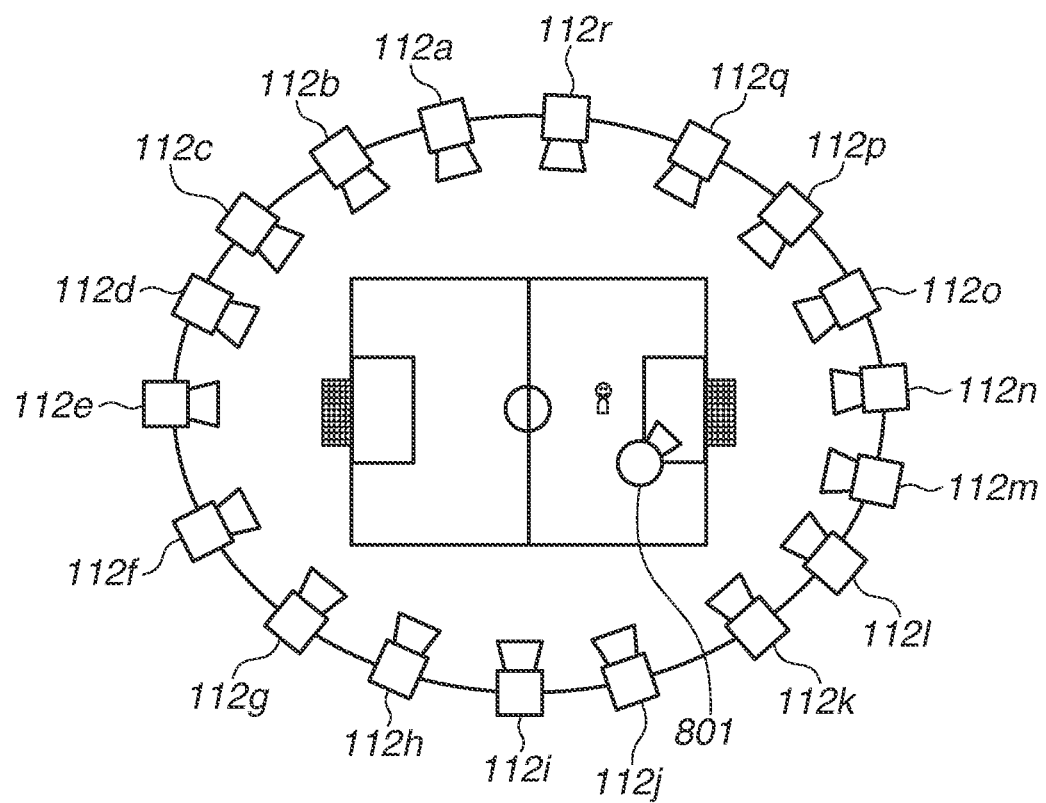

First, a virtual camera 801 will be described with reference to FIG. 4A. The virtual camera 801 is a virtual camera capable of capturing images in a viewpoint different from those of the installed cameras 112. In other words, the virtual viewpoint image generated in the image processing system 100 is an image captured by the virtual camera 801. Referring to FIG. 4A, each of the plurality of sensor systems 110 arranged on the circumference of a circle includes the camera 112. For example, the generation of a virtual viewpoint image makes it possible to generate an image as if the image were captured by a camera located near a soccer goal. The virtual viewpoint image, which is an image captured by the virtual camera 801, is generated by performing image processing on images captured by the plurality of installed cameras 112. When an operator (user) operates the position or the like of the virtual camera 801, an image captured from an arbitrary viewpoint can be obtained. A camera path of the virtual camera 801 is set in advance by the operator, and when a specific scene is detected, the camera path is selected to thereby generate a virtual viewpoint image. The virtual camera 801 is an example of a virtual imaging apparatus.

A transmission unit 811 packs a camera path designated by the operator and transmits the camera path to the virtual camera operation UI 330. Upon reception of the setting of the camera path from the operator on the screen of the end-user terminal 190, the transmission unit 811 starts processing to transmit the virtual camera path to an acquisition unit 812 of the virtual camera operation UI 330. A method for setting the camera path is described below. The virtual camera path is represented by a formula representing a curve on a three-dimensional space of a world coordinate system and world coordinate values representing the position of an object-of-interest. The curve formula is calculated by connecting data points by a spline. The method for calculating the formula is not particularly limited to this method, and any other method can be employed as long as a space curve can be expressed.

Next, the internal configuration of the virtual camera operation UI 330 will be described. The acquisition unit 812 unpacks the packed data sent from the end-user terminal 190 and acquires the virtual camera path. When the acquisition unit 812 acquires the virtual camera path from the transmission unit 811, the acquisition unit 812 sends the acquired virtual camera path to a derivation unit 813.

Figure 4B:
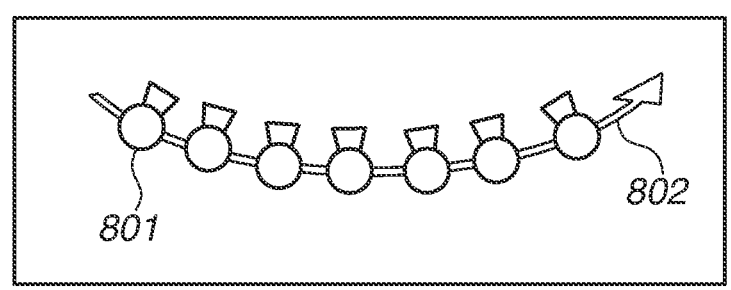

The derivation unit 813 converts the acquired virtual camera path into a virtual camera parameter. As the virtual camera parameter, for example, a matrix representing an extrinsic parameter and a matrix representing an intrinsic parameter are used. In this case, the position and orientation of the virtual camera 801 are included in the extrinsic parameter, and a zoom value is included in the intrinsic parameter. The virtual camera parameter is an information string representing the position and orientation for each frame. For example, when the virtual viewpoint image is set with a frame rate of 60 frames/sec, the virtual camera parameter is a data stream per 1/60 seconds. Specifically, FIG. 4B illustrates an example of the virtual camera parameter for seven frames on a camera path 802 and a data stream for 7/60 seconds. When the derivation unit 813 acquires the virtual camera path from the acquisition unit 812, the derivation unit 813 derives a virtual camera parameter representing the position, orientation, or the like of the virtual camera 801, and sends the virtual camera parameter to a mapping unit 814. The virtual camera parameter may be derived by calculation, or may be derived by, for example, referring to a look-up table.

The mapping unit 814 generates real camera mapping information. The term "real camera mapping" refers to processing of deriving a video image captured by any one of the cameras 112 that is required to generate a virtual viewpoint image. For example, in the case of a virtual camera parameter for one second, the cameras 112 each corresponding to 60 parameters are derived. When the mapping unit 814 acquires the virtual camera parameter from the derivation unit 813, the mapping unit 814 performs real camera mapping processing using camera arrangement information acquired from the back-end server 270. A timing for acquiring the camera arrangement information by the mapping unit 814 is desirably set after the virtual camera parameter is acquired from the derivation unit 813. However, if there is no change in the angle of view or direction of the real camera, for example, if there is no change in the movement of the real camera, the pan/tilt angle of the pan head, and zooming of the real camera, the mapping unit 814 may acquire the camera arrangement information in advance, and the timing for acquiring the camera arrangement information is not particularly limited to this timing. Upon completion of the real camera mapping processing, the mapping unit 814 sends the virtual camera parameter and real camera mapping information to a determination unit 815.

The determination unit 815 determines whether there is a need to correct the virtual camera path designated by the operator. When the determination unit 815 acquires the virtual camera parameter and real camera mapping information from the mapping unit 814, the determination unit 815 acquires the defective camera information acquired from the back-end server 270. Next, the determination unit 815 uses the acquired defective camera information to check the camera 112 which has output a defective video image during a period in which the virtual viewpoint image is generated. After that, the determination unit 815 detects whether the camera 112 described in the defective camera information is included in the cameras 112 described in the real camera mapping information. If the camera 112 described in the defective camera information is included in the cameras 112 described in the real camera mapping information, a video image captured by the defective camera is used to generate the virtual viewpoint image. This indicates that an image with low quality is generated. Accordingly, the determination unit 815 determines that there is a need to correct the camera path designated by the user and sends a virtual camera path correction request to a correction unit 816. If the camera 112 described in the defective camera information is not included in the cameras 112 described in the real camera mapping information, the determination unit 815 determines that there is no need to correct the camera path and sends the virtual camera parameter to a transmission unit 817. In the present exemplary embodiment, the determination unit 815 determines that there is a need to correct the camera path when a defective camera is used. However, for example, in the case of a failure period of 1/60 seconds, the determination unit 815 may determine that there is no need to correct the camera path because a video image for one frame has only a little influence on the virtual viewpoint image. In another example, when only one defective camera is present, the determination unit 815 may determine that there is no need to correct the camera path because the virtual viewpoint image can be generated. When two or more defective cameras are present in succession in the daisy chain connection, the determination unit 815 may determine that there is a need to correct the camera path because it is impossible to generate the virtual viewpoint image. In other words, the determination unit 815 may determine the necessity of correction in view of the degree of influence on the virtual viewpoint image depending on a failure state. The method for determining the necessity of correction is not particularly limited to the above method as long as the quality of the virtual point image can be maintained. The processing performed by the determination unit 815 is an example of determination processing for determining whether there is a need to correct the camera path.

The correction unit 816 corrects the virtual camera path designated by the operator, thereby generating a new camera path. When the correction unit 816 acquires the virtual camera path correction request from the determination unit 815, the correction unit 816 acquires a virtual camera path from the acquisition unit 812 and starts processing for correcting the virtual camera path. The correction processing will be described in detail below. Upon completion of the correction processing, the correction unit 816 sends the corrected camera path to the derivation unit 813.

The transmission unit 817 packs the finally-determined virtual camera parameter and transmits the packed finally-determined virtual camera parameter to the back-end server 270. The finally-determined virtual camera parameter indicates a parameter for the virtual camera path designated by the operator when it is determined that there is no need to correct the virtual camera path, and indicates a parameter for the corrected virtual camera path when it is determined that there is a need to correct the camera path. In other words, the transmission unit 817 sends the virtual camera parameter acquired from the determination unit 815 to the back-end server 270. The back-end server 270 generates a virtual viewpoint image and virtual viewpoint audio by using the received virtual camera parameter.

After that, an output unit 818 of the end-user terminal 190 outputs the virtual camera image and audio received from the back-end server 270.

Figure 5:
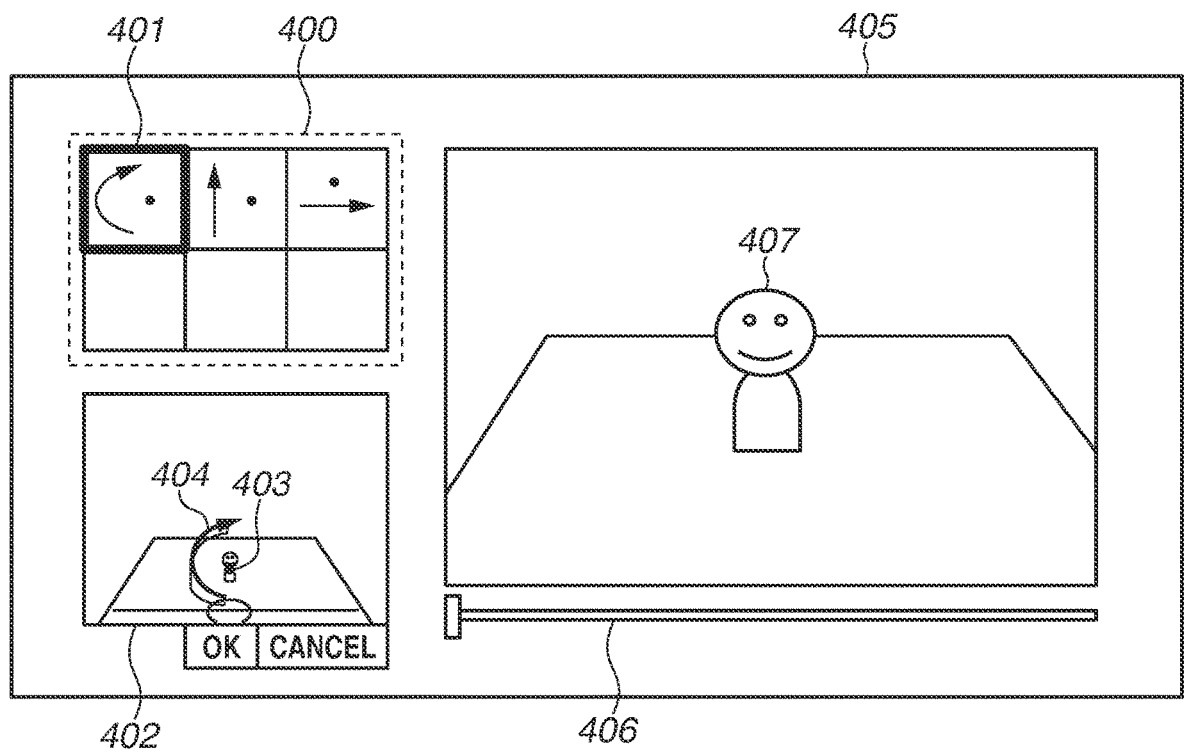
FIG. 5 is a diagram illustrating an example of a screen of an end-user terminal according to one or more aspects of the present disclosure.

Next, a method for setting a camera path to be set on the screen of the end-user terminal 190 will be described with reference to FIG. 5. FIG. 5 illustrates an example of the camera arrangement and imaging contents illustrated in FIG. 4A. A display screen includes a camera path list 400, a camera path setting screen 402, and a virtual viewpoint image display screen 405. The camera path list 400 is displayed as a list of combinations of an object-of-interest 403 and a camera path 404. First, the operator selects a video image captured by any one of the cameras 112 to be displayed on the camera path setting screen 402. In the example of FIG. 5, the operator selects the camera 112e. Next, the operator designates the object-of-interest 403 on the camera path setting screen 402. More specifically, the operator uses an input device, such as a mouse, which is connected to the end-user terminal 190, to move a cursor and then point the cursor to a player 407 on the camera path setting screen 402 and click the player 407. Next, the operator selects one combination of the object-of-interest 403 and the camera path 404 from the camera path list 400. After the selection, the selected camera path is represented by a thick frame line 401 and the camera path 404 indicated by an arrow representing a movement path of a virtual camera is automatically displayed on the camera path setting screen 402. FIG. 5 illustrates that the player 407 is moved half around the center clockwise from the front side. In this case, the direction of the virtual camera is a direction in which the player 407, which is the object-of-interest, is displayed at the center of the screen. After that, the operator makes a minor change of the arrow indicating the camera path 404 on the camera path setting screen 402, as needed. More specifically, the operator determines a virtual viewpoint start position, a virtual viewpoint end position, and a movement path (position, height) of the virtual camera. Lastly, when the operator selects an OK button after the correction of the camera path is completed, the virtual viewpoint image generated based on the designated camera path is displayed on the virtual viewpoint image display screen 405. A bar 406 is used to determine the position of the virtual viewpoint. When a left end is selected, the virtual viewpoint start position is set, and when a right end is selected, the virtual viewpoint end position is set.

Figure 6:
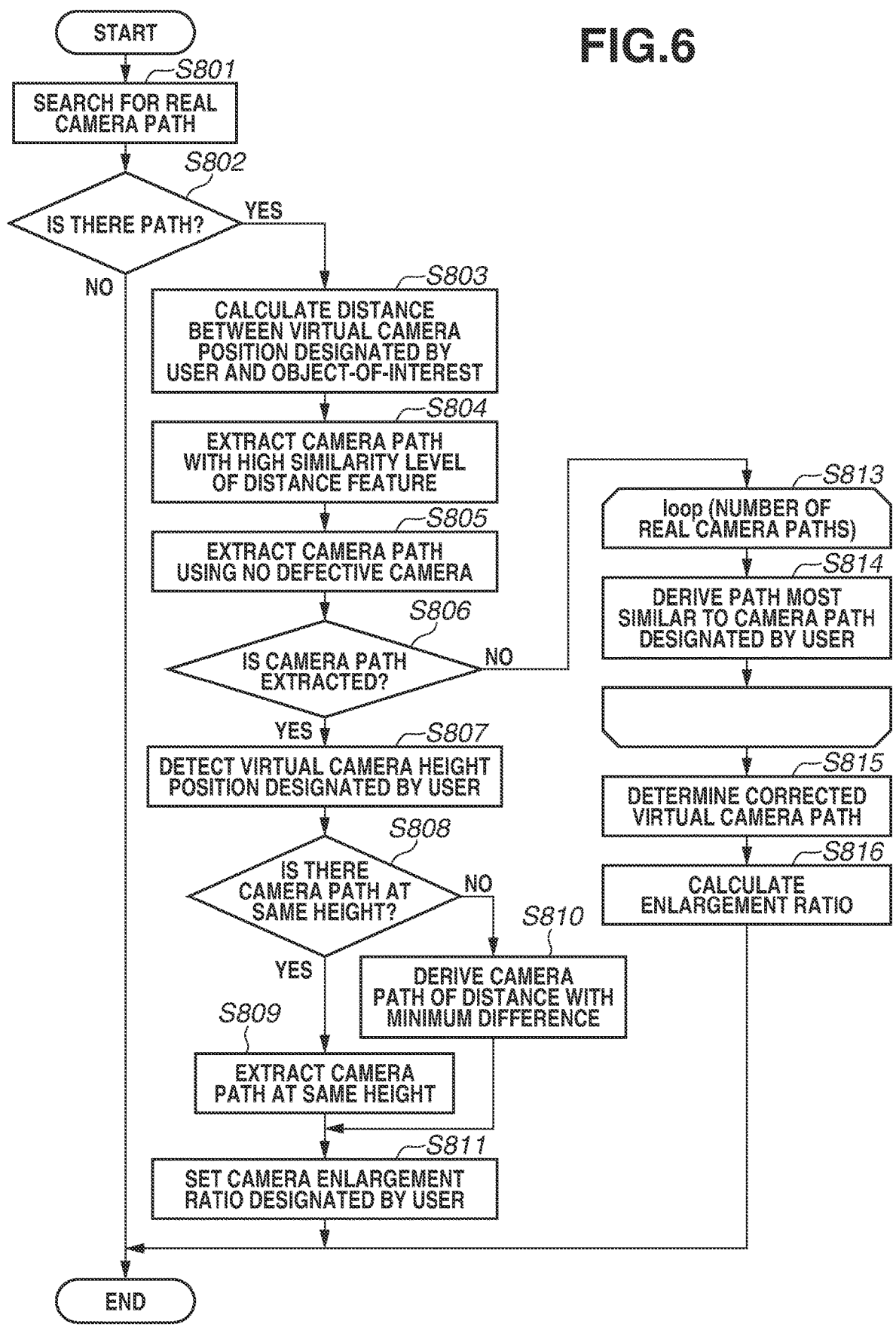
FIG. 6 is a flowchart illustrating an example of information processing to be performed by a correction unit according to one or more aspects of the present disclosure.

Processing for correcting the virtual camera path will be described in detail. FIG. 6 is a flowchart illustrating an example of information processing to be performed by the correction unit 816. When the correction unit 816 acquires the virtual camera path correction request from the determination unit 815, the correction unit 816 acquires the virtual camera path from the acquisition unit 812 and starts the virtual camera path correction processing. Specifically, the virtual camera path correction processing refers to correction of a space curve indicating a virtual camera path. First, in step S801, the correction unit 816 confirms which one of the real cameras 112 is used to generate a virtual viewpoint image at a start point of the virtual camera path and which one of the real cameras 112 is used to generate a virtual viewpoint image at an end point of the virtual camera path. After that, the correction unit 816 searches for the real camera path that is movable from one of the cameras 112 to be used at the start position to another one of the cameras 112 to be used at the end position. In this case, the correction unit 816 searches for a path that does not pass a defective camera. The correction unit 816 searches for a path by deriving a shortest path using Dijkstra's algorithm. The search method is not particularly limited to this method. The correction unit 816 determines whether there is a correction path as a result of the path search. If the correction unit 816 determines that there is no correction path (No in step S802), the correction unit 816 determines that it is impossible to correct the virtual camera path, and the processing of the flowchart illustrated in FIG. 6 is terminated. If the correction unit 816 determines that there is a correction path (Yes in step S802), the processing proceeds to step S803. In step S803, the correction unit 816 calculates a distance between the virtual camera position designated by the user and the object-of-interest. The correction unit 816 acquires world coordinates of the position of the virtual camera and the position of the object-of-interest, and calculates a distance between the coordinate values, thereby obtaining the distance. In step S804, the correction unit 816 extracts a camera path with a high level of similarity to the calculated distance feature. This is because the correction is performed in such a manner that the same distance from the virtual camera position designated by the user is obtained, thereby enabling provision of the virtual viewpoint image to the user in a state where the size of the subject is maintained in the corrected camera path. In step S805, the correction unit 816 extracts a camera path that uses no defective camera from the camera paths extracted in step S804. The distance feature is an example of a feature amount.

In step S806, the correction unit 816 determines whether a camera path using no defective camera has been extracted. If the correction unit 816 determines that a camera path using no defective camera has been extracted (Yes in step S806), the processing proceeds to step S807. If the correction unit 816 determines that a camera path using no defective camera has not been detected (No in step S806), the processing proceeds to step S813. In step S807, the correction unit 816 detects the height position of the virtual camera on the virtual camera path designated by the user. After that, the correction unit 816 determines whether there is a camera path at the same height as the height position detected in step S807 among the camera paths detected in step S805. If the correction unit 816 determines that there is a camera path at the same height (Yes in step S808), the processing proceeds to step S809. If the correction unit 816 determines that there is no camera path at the same height (No in step S808), the processing proceeds to step S810. In step S809, the correction unit 816 determines the camera path as a correction camera path. On the other hand, in step S810, the correction unit 816 derives a camera path closest to the height position of the virtual camera on the camera path designated by the user among the camera paths extracted in step S805. After that, in step S811, the correction unit 816 detects an enlargement ratio on the virtual camera path designated by the user and sets the same value as that designated by the user to the correction camera path determined in step S809 or S810. The reason for setting the same value is that since the distance between the position of the virtual camera and the position of the object-of-interest is the same, the size of the object-of-interest after the correction of the camera path is unchanged from the size of the object-of-interest before the correction of the camera path.

On the other hand, in step S813, the correction unit 816 executes processing of step S814 on each real camera path. Specifically, in step S814, the correction unit 816 derives a camera path most similar to the camera path designated by the user. After that, the correction unit 816 determines an optimum virtual camera path among the camera paths derived for each real camera, and outputs the optimum virtual camera path as the correction camera path. To determine the optimum virtual camera path, the operator may set priorities to the camera paths in advance. For example, such a path that the virtual camera direction of the corrected camera path is the same as that of the camera path designated by the user is selected. In step S816, the correction unit 816 calculates a virtual camera enlargement ratio after correction of the camera path so that the size of the object-of-interest on the camera path designated by the user is unchanged.

Figures 7A, 7B, 7C:
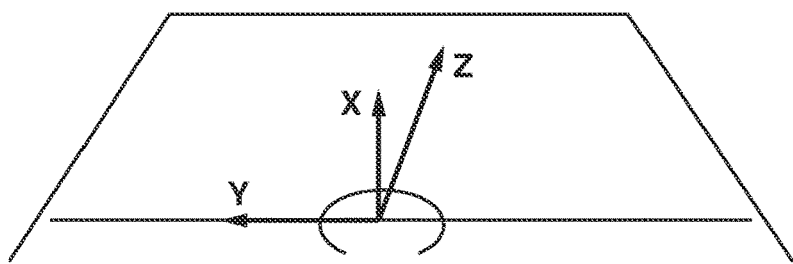

FIG. 7A illustrates an example of feature data on the camera path. In the example of FIG. 7A, the camera path 404 illustrated in FIG. 5 is used as an example. A coordinate X, a coordinate Y, and a coordinate Z represent space coordinate values. FIG. 7B illustrates an example of coordinate axes when the soccer stadium illustrated in FIG. 5 is used as an example. Assuming that the center of a center circle in the soccer stadium is set as an origin, an axis parallel to a long side of the soccer stadium is set as an X-axis, an axis parallel to a short side of the soccer stadium is set as a Y-axis, and a height direction is set as a Z-axis. Each space coordinate value is represented in units of millimeters. An enlargement ratio indicates an enlargement ratio of a virtual camera at each position. A time indicates a time required for the virtual camera to reach each position based on the start position. The start position indicates the start position of the movement path of the virtual camera. The end position indicates the correction position of the movement path of the virtual camera. A height change position indicates a position where ascending and descending of the virtual camera is switched. On the camera path 404, the coordinate Z at the start position is 3000, the coordinate Z at the end position is 3000, and the coordinate Z at the height change position is 6000. This indicates that the virtual camera moves in such a manner that the virtual camera ascends from a height of 3 m to a height of 6 m and then descends to the height of 3 m. An enlargement change position indicates a position where the enlargement and the reduction of the enlargement ratio of the virtual camera are switched. On the camera path 404, the enlargement ratio at the start position is 1.0 time, the enlargement ratio at the end position is 1.0 time, and the enlargement ratio at the enlargement change position is 2.0 times. This indicates that a full-size display is enlarged to a display with a magnification ratio of 2 times and then the display is reduced to the full-size display. The camera path correction processing is processing for correcting the camera path into a new path in a state where the feature data is maintained as much as possible. The camera path is an example of a path. The feature data is an example of a feature amount.

Figure 8A:
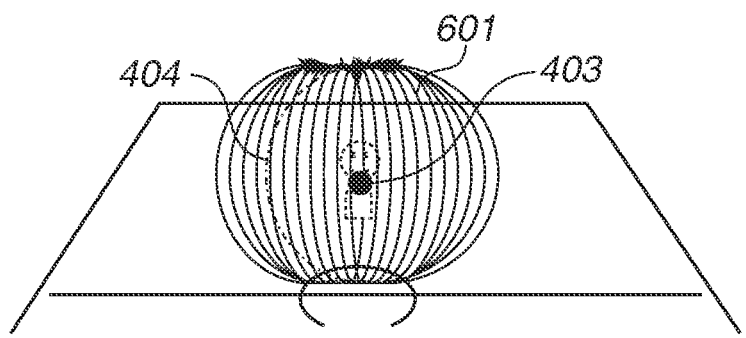
FIGS. 8A to 8D are conceptual diagrams for understanding the process of processing in the flowchart illustrated in FIG. 6.
Figure 8B:
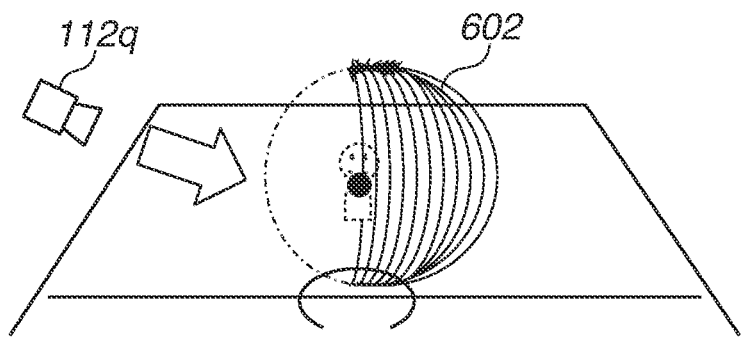
Figure 8C:
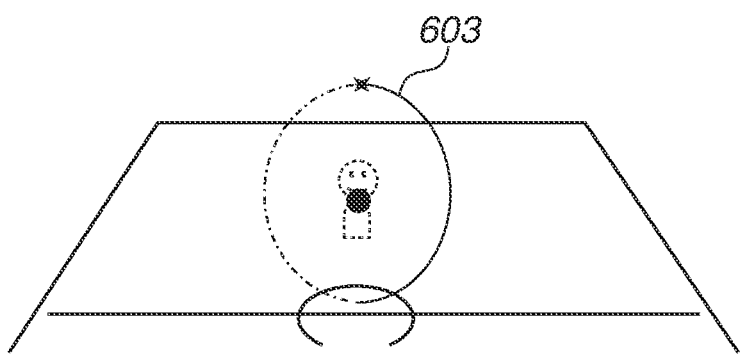
Figure 8D:
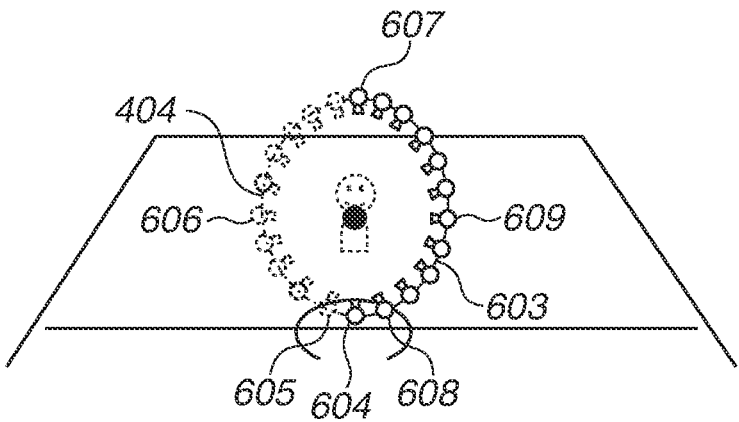

FIGS. 8A to 8D are conceptual diagrams for understanding the process of processing in the flowchart illustrated in FIG. 6. FIGS. 8A to 8D each illustrate an example in which a failure in the camera 112q illustrated in FIG. 4A is detected during setting of the camera path illustrated in FIG. 5 and camera path correction processing is performed. First, the camera 112 to be used to generate a virtual viewpoint image of a virtual camera path is derived. As a result, at the start position of the virtual camera path, the camera 112d, the camera 112e, and the camera 112f are derived, and at the end position of the virtual camera path, the camera 112m, the camera 112n, and the camera 112o are derived. Next, a path for moving from the real camera corresponding to the start position to the real camera corresponding to the end position is searched. As a result of the search, a counterclockwise path that passes the camera 112j is derived. In this example, the number of path search results is one. However, a plurality of path search results may be derived. For example, real cameras are arranged in a circle on two (upper and lower) stages of the stadium. If a failure has detected in a camera installed on the lower stage, a path using the cameras installed on the upper stage is detected and thus a plurality of paths is derived. Next, the correction unit 816 extracts a camera path with the distance between the virtual camera position and the object-of-interest being the same as that of the camera path designated by the user. FIG. 8A illustrates the conceptual diagram thereof. Arrows 601 indicate camera paths having the same distance between the virtual camera position of the camera path 404 designated by the user and the position of the object-of-interest 403. At this point, there are a large number of arrows 601. Next, the correction unit 816 extracts a camera path that does not use the defective camera 112q from the arrows 601. FIG. 8B illustrates the conceptual diagram thereof. Among the arrows 601, camera paths in which the direction of the virtual camera is the same as the camera direction of the defective camera 112q are deleted. Accordingly, arrows 602 enable generation of a virtual viewpoint image without using the defective camera 112q, thereby making it possible to provide an image with high quality. At this point, a plurality of arrows 602 is present, although the number of arrows 602 is smaller than the number of arrows 601. Next, since the correction unit 816 has been able to detect the camera path that does not use a defective camera, the correction unit 816 detects the height position of the virtual camera on the virtual camera path designated by the user and extracts a camera path at the same height. FIG. 8C illustrates the conceptual diagram thereof. The correction unit 816 detects a camera path at the same height position as the camera path 404 designated by the user, thereby detecting an arrow 603. In the example of FIG. 7A, the correction unit 816 confirms that the value of the coordinate Z at the height change position is 3000 mm, and detects a camera path with a height position of 3000 mm after five seconds from the start position from among the arrows 602. Accordingly, on the corrected virtual camera path, the coordinate Y at the height change position of feature data is −5000. Lastly, the correction unit 816 sets the enlargement ratio of the virtual camera. In this example, since the distance between the virtual camera and the object-of-interest is the same as that on the camera path designated by the user, the correction unit 816 sets the same value as the camera enlargement ratio on the camera path designated by the user. FIG. 8D is the conceptual diagram thereof. The feature data illustrated in FIG. 7A is described by way of example. The virtual camera at the start position corresponds to a virtual camera 604. The virtual camera at the end position corresponds to a virtual camera 607. The virtual camera at the enlargement change position corresponds to a virtual camera 606. Specifically, the enlargement ratio is set in such a manner that the virtual camera 604 has a zoom ratio of 1 time and the zoom ratio of the virtual camera is gradually increased toward the virtual camera 606 so that the virtual camera 606 has a zoom ratio of 2 times, and then the zoom ratio of the virtual camera is gradually decreased toward the virtual camera 607 so that the virtual camera 607 has a zoom ratio of 1 time. The correction unit 816 also sets the same enlargement ratio to the corrected camera path 603 (same as the arrow 603 in FIG. 8C). More specifically, the correction unit 816 sets the enlargement ratio on the corrected camera path 603 in such a manner that the zoom ratio of the virtual camera is gradually increased toward the virtual camera 609 after five seconds from the start position so that the virtual camera 609 has a zoom ratio of 2 times, and then the zoom ratio of the virtual camera is gradually decreased toward the virtual camera 607 so that the virtual camera 607 has a zoom ratio of 1 time. By the processing described above, in the example of FIG. 7A, the corrected camera path is obtained by correcting only the coordinate Y at the height change position in the feature data on the camera path obtained before correction.

Another example of the camera path correction processing will be described. FIG. 7C illustrates an example of the virtual camera path designated by the operator. In the example of FIG. 7C, the height change position and the enlargement change position are not included. Accordingly, the camera path moves in the X-axis direction from the start position to the end position, and the virtual cameras are set at the same height and thus enlargement processing is not carried out. A viewpoint is set to capture an image of a player from an obliquely upward position along the player with a distance of 5 m from the left side and at a height position of 3 m. In this case, if the camera path correction processing is carried out according to the processing of the flowchart illustrated in FIG. 6, a viewpoint is set to capture an image of the player from an obliquely upward position along the player with a distance of 5 m from the "right" side and at a height position of 3 m. In other words, only the coordinate Y at the start position is changed from 5000 to −5000 and the other features can be maintained.

As described above, according to the present exemplary embodiment, if there is a need to change a preliminarily designated path, a new path is determined so as not to change the features of the virtual viewpoint image generated based on the preliminarily designated path, thereby making it possible to provide a video image without impairing the content desired by the user.

A second exemplary embodiment illustrates a method for detecting a load on arithmetic processing for generating a virtual viewpoint image to determine whether to correct a path in a system that determines a new path so as not to change features of a virtual viewpoint image generated based on a preliminarily designated path. As the load on the arithmetic processing increases, it becomes more difficult to generate a virtual viewpoint image, so that an image with low quality is generated. Therefore, the second exemplary embodiment provides a solution to this problem.

The camera adapter 120 has a function of separating an image obtained from the camera 112 into a foreground image and a background image and transmitting the separated images to the subsequent camera adapter, in addition to the function according to the first exemplary embodiment. The reason for separating an image is that a portion with no change in the image is transmitted as the background image by reducing the frame rate and only a portion with a change in the image is transmitted as the foreground image without reducing the frame rate, thereby reducing the amount of data transfer. Accordingly, foreground images and background images captured by all cameras are stored in the database 250. The back-end server 270 has a function of acquiring all foreground data from the database 250 and detecting coordinate positions, in addition to the function according to the first exemplary embodiment.

Figure 9:
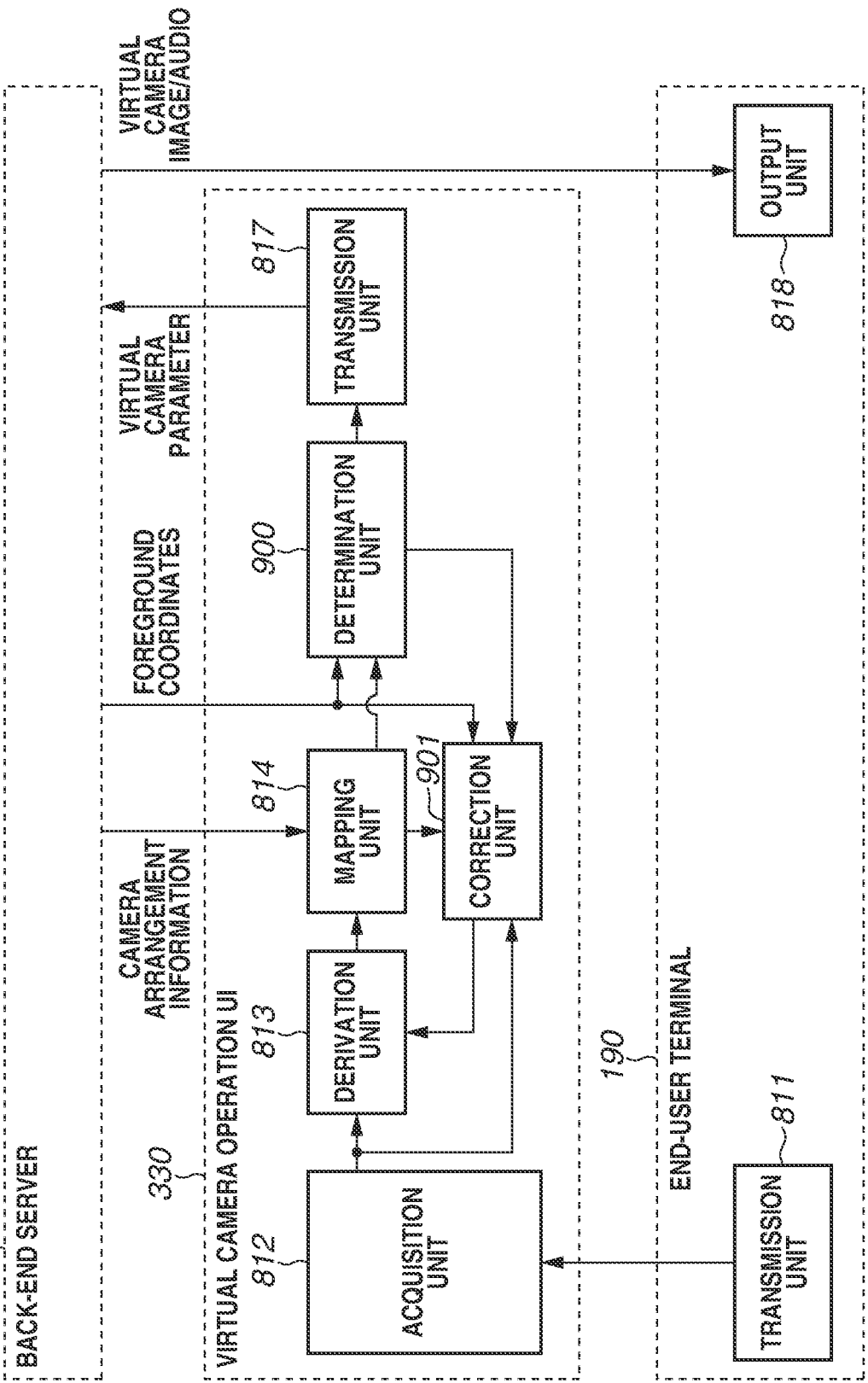
FIG. 9 is a block diagram illustrating an example of a functional configuration of the virtual camera operation UI and the like according to one or more aspects of the present disclosure.

The functional configuration of the virtual camera operation UI 330 in the image processing system illustrated in FIG. 1 will be described with reference to FIG. 9.

When a determination unit 900 acquires a virtual camera parameter from the mapping unit 814, the determination unit 900 acquires foreground coordinate information acquired from the back-end server 270. The foreground coordinate information indicates the world coordinate position and size of an object recognized as a foreground during a period in which the virtual viewpoint image is generated. After that, the determination unit 900 uses the virtual camera parameter and the foreground coordinate information to calculate, for each virtual viewpoint image, the proportion of the foreground within the image. A case where the proportion exceeds a set threshold indicates that it is difficult to generate a virtual viewpoint image and an image with low quality is generated. The set threshold used herein is not particularly limited. The set threshold may be a value that is uniquely determined by an algorithm used to generate a virtual viewpoint image in advance, or a value that is dynamically changed depending on a background image obtained during image capturing. When the proportion exceeds the set threshold, the determination unit 900 determines that there is a need to correct the camera path designated by the user, and sends the virtual camera path correction request to a correction unit 901. When the proportion does not exceed the set threshold, the determination unit 900 determines that there is no need to correct the camera path and sends the virtual camera parameter to the transmission unit 817.

When the correction unit 901 acquires the virtual camera path correction request from the determination unit 900, the correction unit 901 acquires the virtual camera path from the acquisition unit 812 and starts virtual camera path correction processing.

Figure 10:
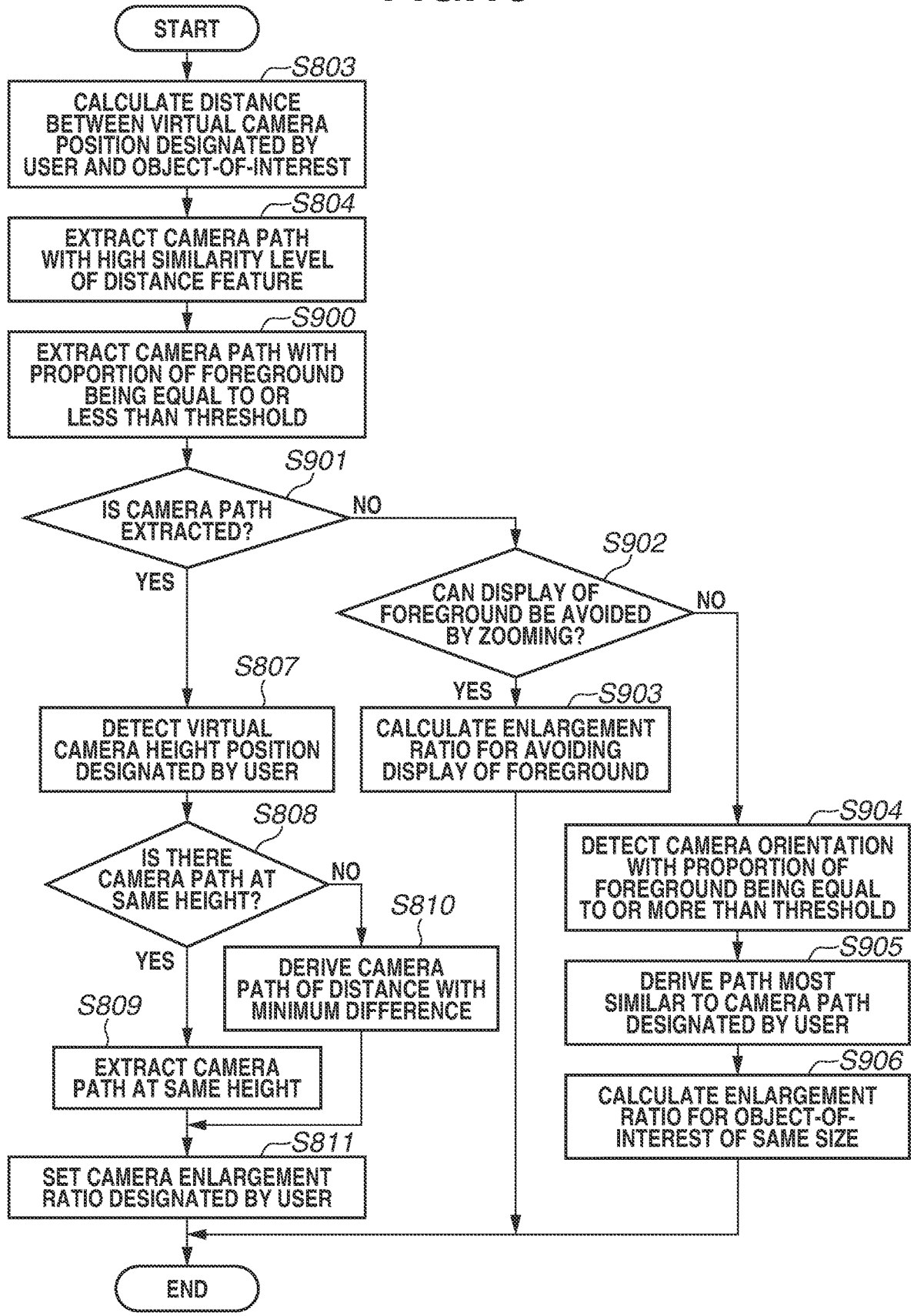
FIG. 10 is a flowchart illustrating an example of information processing to be performed by the correction unit according to one or more aspects of the present disclosure.

The virtual camera path correction processing will be described in detail. FIG. 10 is a flowchart illustrating an example of information processing to be performed by the correction unit 901. When the correction unit 901 acquires the virtual camera path correction request from the determination unit 900, the correction unit 901 acquires the virtual camera path from the acquisition unit 812 and starts the virtual camera path correction processing. Specifically, the virtual camera path correction processing refers to correction of a space curve representing a virtual camera path. In step S804, the correction unit 901 extracts a camera path having a high level of similarity to the distance feature between the virtual camera position designated by the user and the object-of-interest. Next, in step S900, the correction unit 901 extracts a camera path with a proportion of a foreground being equal to or less than a threshold from among the camera paths extracted in step S804. In step S901, the correction unit 901 determines whether there is a camera path with the proportion of the foreground being equal to or less than the threshold. If the correction unit 901 determines that there is a camera path with the proportion of the foreground being equal to or less than the threshold (Yes in step S901), the processing proceeds to step S807. If the correction unit 901 determines that there is no camera path with the proportion of the foreground being equal to or less than the threshold (No in step S901), the processing proceeds to step S902. In step S807, the correction unit 901 detects the height position of the virtual camera on the virtual camera path designated by the user. Further, in step S811, the correction unit 816 detects the enlargement ratio on the virtual camera path designated by the user, and sets the same value as that designated by the user to the corrected camera path determined in step S809 or S810. The processing of step S901 is an example of processing for determining whether the amount of calculation for generating a virtual viewpoint image exceeds a threshold.

On the other hand, in step S902, the correction unit 901 confirms whether the proportion of the foreground can be reduced by changing the enlargement ratio on the camera path designated by the used. For example, when the foreground is concentrated at an end of the virtual viewpoint image, the enlargement ratio is increased so as not to display the end of the virtual viewpoint image, thereby reducing the proportion of the foreground. The correction unit 901 determines whether the proportion of the foreground can be reduced by changing the enlargement ratio. If the correction unit 901 determines that the proportion of the foreground can be reduced by changing the enlargement ratio (Yes in step S902), the processing proceeds to step S903. If the correction unit 901 determines that the proportion of the foreground cannot be reduced by changing the enlargement ratio (No in step S902), the processing proceeds to step S904. In step S903, the correction unit 901 calculates the enlargement ratio so that the proportion of the foreground does not exceed the threshold and corrects the enlargement ratio so as to prevent an unnatural display from being presented to the user. For example, a rapid enlargement may result in an unpleasant display for the user. Accordingly, the correction unit 901 sets the amount of change in the enlargement ratio within a certain range. On the other hand, in step S904, the correction unit 901 detects the position and direction of the virtual camera with the proportion of the foreground being equal to or more than the threshold. Further, in step S905, the correction unit 901 derives a path most similar to the camera path which does not pass the detected section and which is designated by the user. In step S906, the correction unit 901 calculates the enlargement ratio so that the size of the object-of-interest in the virtual viewpoint image on the corrected camera path is equal to the size of the object-of-interest in the virtual viewpoint image on the camera path designated by the user.

As described above, according to the present exemplary embodiment, it is possible to determine a new path so as not to change features of a virtual viewpoint image generated based on a preliminarily designated path, while preventing display of a video image with low quality due to an increase in load on arithmetic processing. Consequently, a video image can be provided without impairing the content desired by the user.

A third exemplary embodiment illustrates a method for preventing a user from selecting a preliminarily designated path when it is determined that the preliminarily determined path cannot be used in a system that determines a new path so as not to change features of a virtual viewpoint image generated based on the preliminarily designated path.

Figure 11:
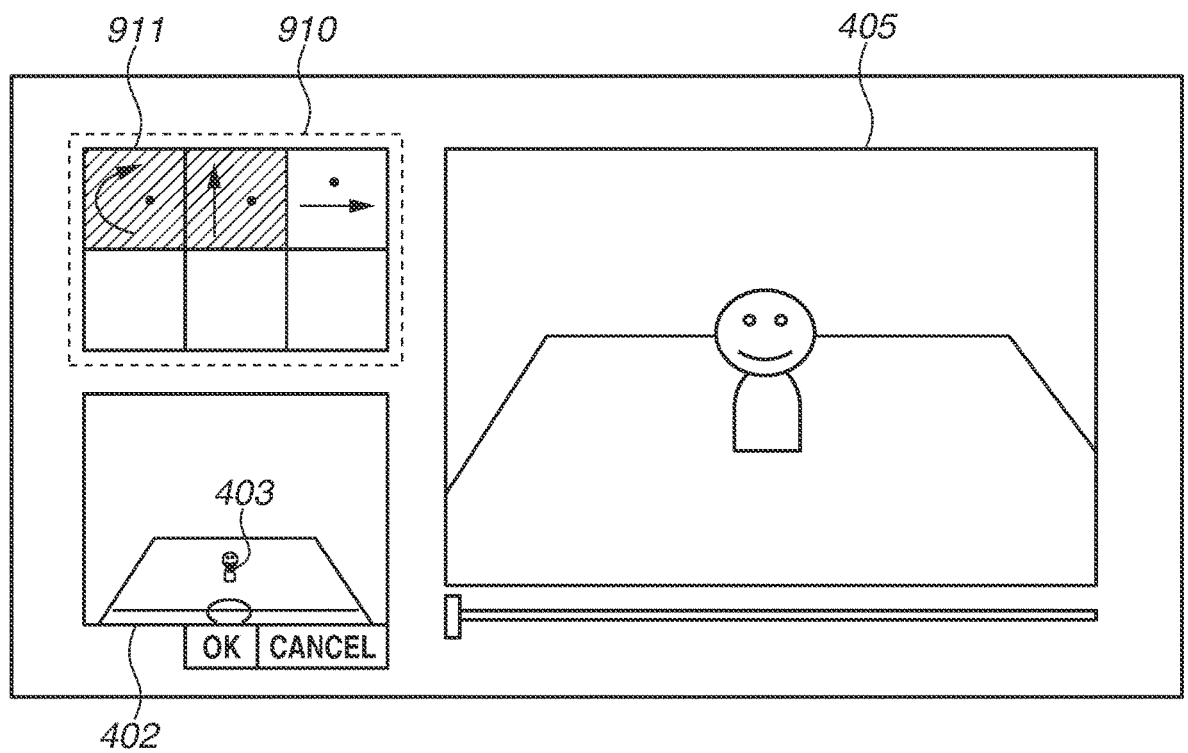
FIG. 11 is a diagram illustrating an example of the screen of the end-user terminal according to one or more aspects of the present disclosure.

A method for setting a camera path to be set on the screen of the end-user terminal 190 will be described with reference to FIG. 11. FIG. 11 illustrates an example of the camera arrangement and imaging contents illustrated in FIG. 4A. A display screen includes a camera path list 910, the camera path setting screen 402, and the virtual viewpoint image display screen 405. The camera path list 910 is displayed as a list of combinations of an object-of-interest and a camera path. First, the operator selects a video image captured by any one of the cameras 112 as a video image to be displayed on the camera path setting screen 402. In the example of FIG. 11, the camera 112e is selected. Next, the operator designates the object-of-interest 403 on the camera path setting screen 402. In this case, the transmission unit 811 of the end-user terminal 190 transmits all virtual camera paths included in the camera path list 910 to the virtual camera operation UI 330. After that, the virtual camera operation UI 330 determines whether there is a need to correct the received virtual camera paths. The determination method is similar to that of the first exemplary embodiment and thus the description thereof is omitted. After that, the virtual camera operation UI 330 transmits correction necessity information on all virtual camera paths to the end-user terminal 190. When the end-user terminal 190 acquires the correction necessity information, the end-user terminal 190 displays in, for example, gray, a display area for the camera path for which it is determined that a correction is required among the camera paths displayed in the camera path list 910. Further, the end-user terminal 190 controls the display to prevent the operator from selecting the camera path displayed in gray. The example of FIG. 11 illustrates a case where a failure has occurred in the camera 112q illustrated in FIG. 4A. On a camera path 911, a virtual viewpoint image is to be generated using the camera 112q. Accordingly, it is determined that there is a need to correct the camera path 911 and thus the camera path 911 is displayed in gray and cannot be selected. As the display content, a gray display is employed in the example of FIG. 11, but instead the camera path 911 may be displayed in a transmissive manner or may be deleted. The display content is not particularly limited as long as the user can understand that the camera path cannot be selected.

According to the exemplary embodiment described above, it is possible to prevent the user from selecting a preliminarily designated path when it is determined that the preliminarily designated path cannot be used in the system that determines a new path so as not to change features of a virtual viewpoint image generated based on the preliminarily designated path. While the exemplary embodiments of the present disclosure have been described in detail above, the present disclosure is not limited to the exemplary embodiments described above and can be modified or changed within the scope of the present disclosure described in the claims.

A fourth exemplary embodiment illustrates a method that enables a user to select an automatically corrected camera path in a configuration in which when it is determined that a preliminarily designated path cannot be used, a camera path is corrected and displayed in a system that determines a new path so as not to change features of a virtual viewpoint image generated based on the preliminarily designated path.

Figure 12:
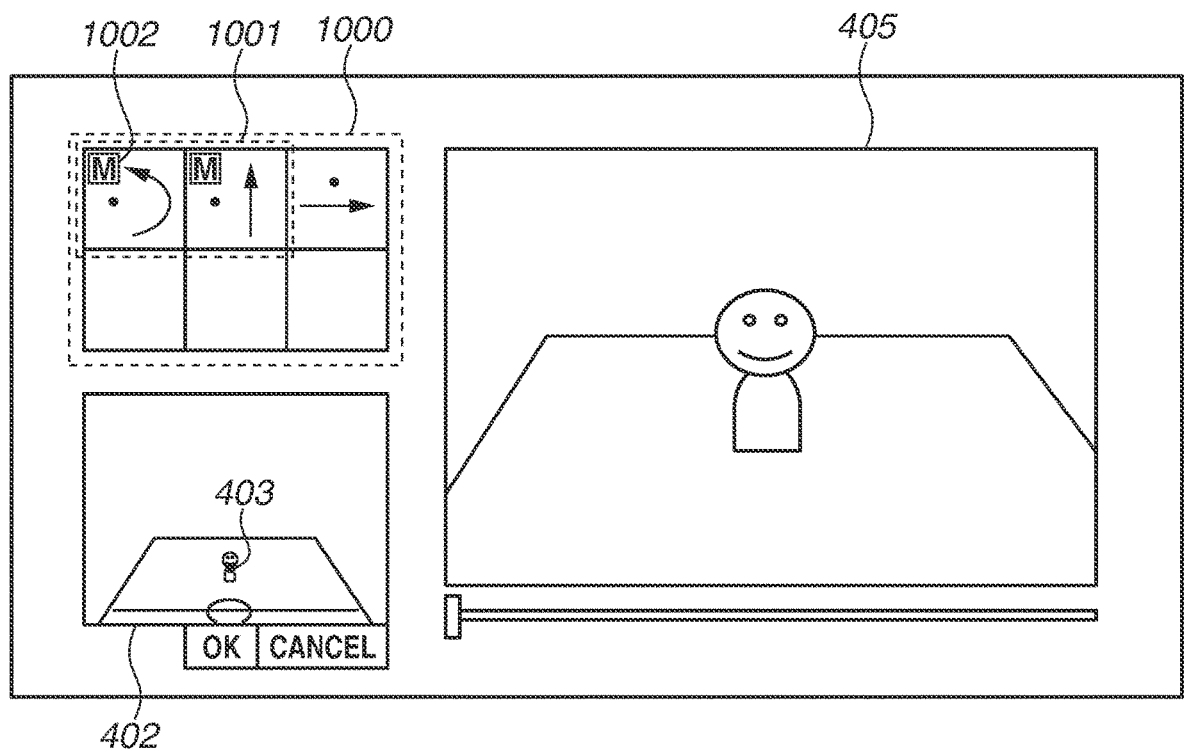
FIG. 12 is a diagram illustrating an example of the screen of the end-user terminal according to one or more aspects of the present disclosure.

A method for setting a camera path to be set on the screen of the end-user terminal 190 will be described with reference to FIG. 12. FIG. 12 illustrates an example of the camera arrangement and imaging contents illustrated in FIG. 4A. A display screen includes a camera path list 1000, the camera path setting screen 402, and the virtual viewpoint image display screen 405. The camera path list 1000 is displayed as a list of combinations of an object-of-interest and a camera path. First, the operator selects a video image captured by any one of the cameras 112 as a video image to be displayed on the camera path setting screen 402. In the example of FIG. 12, the camera 112e is selected. Next, the operator designates the object-of-interest 403 on the camera path setting screen 402. In this case, the transmission unit 811 of the end-user terminal 190 transmits all virtual camera paths included in the camera path list 1000 to the virtual camera operation UI 330. After that, the virtual camera operation UI 330 determines whether there is a need to correct the acquired virtual camera path. If there is a need to correct the virtual camera path, a correction camera path is derived. The determination method and the derivation method are similar to those of the first exemplary embodiment and thus descriptions thereof are omitted. After that, the virtual camera operation UI 330 transmits, to the end-user terminal 190, the correction necessity information on all virtual camera paths and the correction camera path for the camera path for which it is determined that a correction is required. When the end-user terminal 190 acquires the correction necessity information and the correction camera path, the end-user terminal 190 displays the corrected virtual camera movement path in a display area for the camera path for which it is determined that a correction is required among the camera paths displayed in the camera path list 1000. The corrected display content is represented by a camera path 1001. The end-user terminal 190 displays a correction icon 1002 on the camera path 1001 so that the user can understand that the correction has been made. In the example of FIG. 12, "M" is displayed as the initial letter of a term "Modify". In the example of FIG. 12, a display of characters is employed as a method for notifying the user of the completion of correction processing. However, the thickness or color of a camera path display frame may be changed, a background color may be changed, or the color or style of a virtual camera movement path may be changed. The notification method is not particularly limited as long as the method allows the user to understand that the correction processing has been performed.

According to the exemplary embodiment described above, a camera path is automatically corrected and the corrected camera path is displayed when it is determined that the preliminarily designated path cannot be used in the system that determines a new path so as not to change features of a virtual viewpoint image based on the preliminarily designated path. This configuration enables the user to select the automatically corrected camera path.

While examples of exemplary embodiments of the present disclosure have been described in detail above, the present disclosure is not limited to specific exemplary embodiments.

A part or the whole of the functional configuration of the virtual camera operation UI 330 may be implemented in the controller 300 as a hardware configuration.

According to the processing in each exemplary embodiment described above, if there is a need to change a preliminarily designated path, a new path is determined so as not to change features of a virtual viewpoint image generated based on the preliminarily designated path, thereby making it possible to provide a video image without impairing the content desired by the user.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims is to be accorded the broadest interpretation so as to encompass all such modifications and equivalent structures and functions.

This application claims the benefit of Japanese Patent Application No. 2017-111603, filed Jun. 6, 2017, which is hereby incorporated by reference herein in its entirety.

What is claimed is:

1. An information processing apparatus comprising:
one or more hardware processors; and
one or more memories which store instructions executable by the one or more hardware processors to cause the information processing apparatus to perform at least:
receiving a setting defining a movement path of a virtual viewpoint corresponding to a virtual viewpoint image to be generated based on image data that is obtained by image capturing with a plurality of image capturing apparatuses in different directions;
determining, depending on at least one of the image data and a state of an image capturing apparatus included in the plurality of image capturing apparatuses, whether to change a movement path of the virtual viewpoint to be used for generating the virtual viewpoint image from the movement path defined by the received setting to another movement path; and
changing the movement path of the virtual viewpoint according to the determining.

2. The information processing apparatus according to claim 1, wherein whether the movement path is to be changed is determined based on a result of detecting a failure of at least one of the image data and the state of the image capturing apparatus.

3. The information processing apparatus according to claim 1, wherein the instructions further cause the information processing apparatus to perform
identifying an image capturing apparatus to be used for generating a virtual viewpoint image according to the movement path defined by the received setting, and
wherein the movement path is changed in a case where determination processing to determine whether an image captured by the identified image capturing apparatus is usable for generating the virtual viewpoint image.

4. The information processing apparatus according to claim 1, wherein the instructions further cause the information processing apparatus to perform:
identifying image capturing apparatuses to be used for generating a virtual viewpoint image according to the movement path defined by the received setting; and
detecting an image capturing apparatus in a defective state from among the identified image capturing apparatuses, and
wherein whether the movement path is to be changed is determined based on a result of the detecting.

5. The information processing apparatus according to claim 4, wherein the movement path is changed in a case where a number of defective image capturing apparatuses detected among the identified image capturing apparatuses is equal to or more than a threshold.

6. The information processing apparatus according to claim 4, wherein the movement path is changed in a case where a defective image capturing apparatus detected is in a defective state for a predetermined time or longer.

7. The information processing apparatus according to claim 1, wherein the movement path is changed in such a manner that a specific object included in a virtual viewpoint image according to the movement path defined by the received setting is also included in a virtual viewpoint image according to the changed movement path.

8. The information processing apparatus according to claim 1, wherein the movement path is changed in such a manner that a height of the virtual viewpoint is maintained between before and after the change of the movement path.

9. The information processing apparatus according to claim 1, wherein the movement path is changed in such a manner that a size of a specific object in a virtual viewpoint image according to the movement path defined by the received setting is same as a size of the specific object in a virtual viewpoint image according to the changed movement path.

10. The information processing apparatus according to claim 1, wherein the movement path to be used is changed based on priority information for movement paths.

11. The information processing apparatus according to claim 1, wherein the instructions further cause the information processing apparatus to perform detecting an image capturing apparatus in a state where ratio of an area of one or more specific objects in a captured image captured by the image capturing apparatus to an area of the whole of the captured image is than a predetermined ratio, and wherein
whether the movement path is to be changed is determined based on a result of the detecting.

12. The information processing apparatus according to claim 1, wherein in the receiving:
information for identifying a movement path designated by a user is received as the setting.

13. The information processing apparatus according to claim 1, wherein the instructions further cause the information processing apparatus to perform
control for causing a display screen to display a movement path of the virtual viewpoint according the changed movement path.

14. An information processing method, the method comprising:
receiving a setting defining a movement path of a virtual viewpoint corresponding to a virtual viewpoint image to be generated based on image data that is obtained by image capturing with a plurality of image capturing apparatuses in different directions;
determining, depending on at least one of the image data and a state of an image capturing apparatus included in the plurality of image capturing apparatuses, whether to change a movement path of the virtual viewpoint to be used for generating the virtual viewpoint image from the movement path defined by the received setting to another movement path; and
changing the movement path of the virtual viewpoint according to the determining.

15. A non-transitory computer-readable storage medium storing a program for causing a computer to execute an information processing method, the information processing method comprising:
receiving a setting defining a movement path of a virtual viewpoint corresponding to a virtual viewpoint image to be generated based on image data that is obtained by image capturing with a plurality of image capturing apparatuses in different directions;
determining, depending on at least one of the image data and a state of an image capturing apparatus included in the plurality of image capturing apparatuses, whether to change a movement path of the virtual viewpoint to be used for generating the virtual viewpoint image from the movement path defined by the received setting to another movement path; and
changing the movement path of the virtual viewpoint according to the determining.

16. The information processing apparatus according to claim 1, wherein the instructions further cause the information processing apparatus to perform outputting the changed movement path to a generation apparatus that is configured to generate a virtual viewpoint image corresponding to the movement path of the virtual viewpoint.

17. The information processing apparatus according to claim 1, wherein the instructions further cause the information processing apparatus to perform generating a virtual viewpoint image corresponding to the changed movement path of the virtual viewpoint.

18. The information processing apparatus according to claim 4, wherein a virtual viewpoint image according to the changed movement path is generated without using an image captured by the detected image capturing apparatus in the defective state.

* * * * *